United States Patent
Räsänen (12)

(10) Patent No.: US 6,172,968 B1
(45) Date of Patent: Jan. 9, 2001

(54) HIGH-SPEED DATA TRANSMISSION IN MOBILE COMMUNICATION NETWORKS

(75) Inventor: Juha Räsänen, Espoo (FI)

(73) Assignee: Nokia Telecommunications OY, Espoo (FI)

(*) Notice: Under 35 U.S.C. 154(b), the term of this patent shall be extended for 0 days.

(21) Appl. No.: 08/913,220

(22) PCT Filed: Mar. 6, 1996

(86) PCT No.: PCT/FI96/00135

§ 371 Date: Sep. 8, 1997

§ 102(e) Date: Sep. 8, 1997

(87) PCT Pub. No.: WO96/27960

PCT Pub. Date: Sep. 12, 1996

(30) Foreign Application Priority Data

Mar. 6, 1995 (FI) .......... 951018

(51) Int. Cl.[7] .......... H04J 3/16; H04B 7/26; H04Q 7/22

(52) U.S. Cl. .......... 370/329; 370/349; 370/465; 370/471; 455/450

(58) Field of Search .......... 370/235, 329, 370/345, 347, 349, 389, 465, 470, 471, 505, 506, 536, 542, 912, 913; 455/450, 451, 452, 453

(56) References Cited

U.S. PATENT DOCUMENTS

| | | | |
|---|---|---|---|
| 4,860,283 | 8/1989 | Takano et al. | 370/470 |
| 5,050,166 | * 9/1991 | Cantoni et al. | 370/474 |
| 5,291,515 | 3/1994 | Uchida et al. | 375/130 |
| 5,373,502 | 12/1994 | Turban | 370/342 |
| 5,442,625 | 8/1995 | Gitlin et al. | 370/335 |
| 5,459,720 | * 10/1995 | Iliev et al. | 370/389 |

(List continued on next page.)

OTHER PUBLICATIONS

"An Overview of the Application of Code Division Multiple Access (CDMA) to Digital Cellular Systems and Personal Cellular Networks," Qualcomm Incorporated, May 21, 1992.

International Telecommunications Union, The Internat'l Telegraph and Telephone Consultative Committee, "Data Communication Over the Telephone Network", "A Duplex Modem Operating at Data Signaling Rates of up to 14 400 bit/s For Use on the General Switched Telephone Network and on Lease Point–to–Point 2–Wire Telephone–Type Circuits", Geneva, 1991, Recommendation V.32 Bis. pp. 1 to 22.

(List continued on next page.)

*Primary Examiner*—Alpus H. Hsu
(74) *Attorney, Agent, or Firm*—Pillsbury, Madison & Sutro Intellectual Property

(57) ABSTRACT

The invention relates to a digital mobile communication system and a method for high-speed data transmission in a digital mobile communication system. The mobile network allocates two or more parallel traffic channels to a high-speed data signal which requires a transmission rate that exceeds the maximum transmission rate of one traffic channel. The high-speed data signal is packed into transmission frames which contain a fixed number N of information bits. The number of the information bits is such that the data rate of the frame is fixed and corresponds to a standard rate adaptation of a traffic channel in the mobile communication system, for example 9.6 Kbps. Among these information bits of the transmission frame, a variable number of bits N1 which is dependent on the data rate of the high-speed data signal is employed for the transmission of the user data. From the remaining "free" information bits of the frame, n bits are control bits which indicate the number N1 of the user data bits in the frame. The remaining k information bits are stuff bits. By means of the invention, the transmission rate of the user data in the transmission frames may vary between 0 and a preset maximum value.

9 Claims, 3 Drawing Sheets

U.S. PATENT DOCUMENTS

| | | | |
|---|---|---|---|
| 5,483,531 | * 1/1996 | Jouin et al. | 370/465 |
| 5,528,579 | * 6/1996 | Wadman et al. | 370/522 |
| 5,583,851 | 12/1996 | Kato et al. | 370/342 |
| 5,956,332 | 9/1999 | Rasanen et al. | 370/342 |
| 5,966,374 | 10/1999 | Räsänen | 370/337 |
| 6,005,857 | 12/1999 | Honkasalo et al. | 370/337 |

OTHER PUBLICATIONS

Internat'l Telecommunication Union, The Internat'l Telegraph and Telephone Consultative Committee, "Data Communication Over the Telephone Network", Support by an ISDN of Data Terminal Equipment with V–Series Type Interfaces With Provision For Statistical Multiplexing, Sep. 1992, Recommendation V.120, pp. 1 to 36.

ETSI/PT 12, "Recommendation GSM 08.60", "Inband Control of Remote Transcoders and Rate Adoptors", Oct. 1990, pp. 3 to 29.

* cited by examiner

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

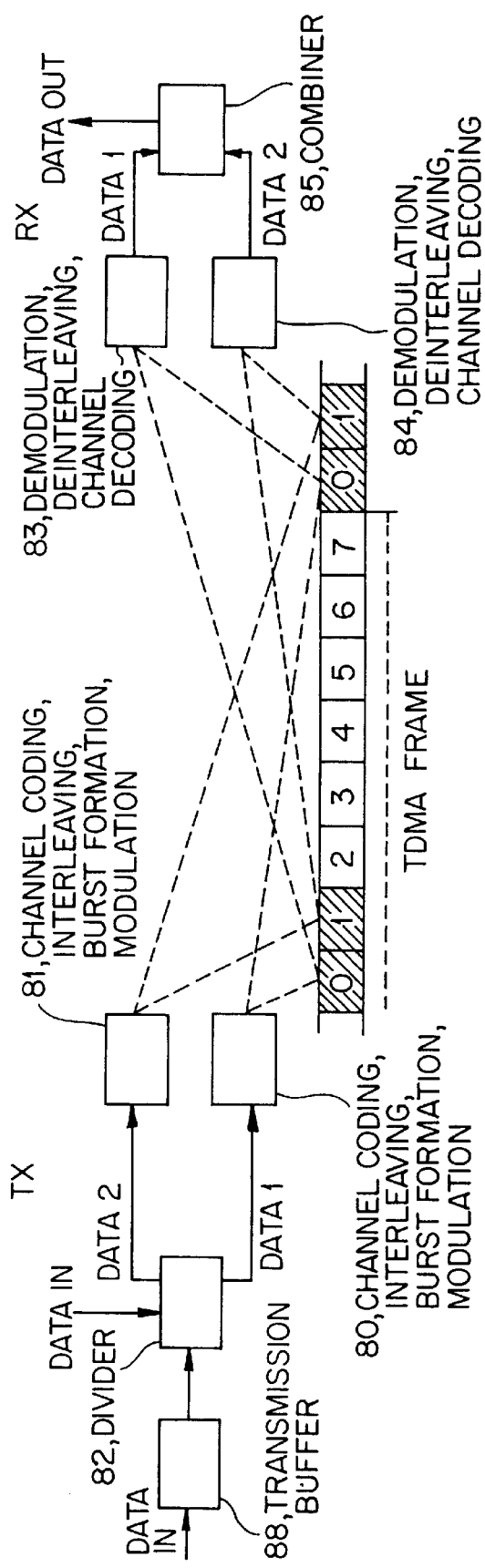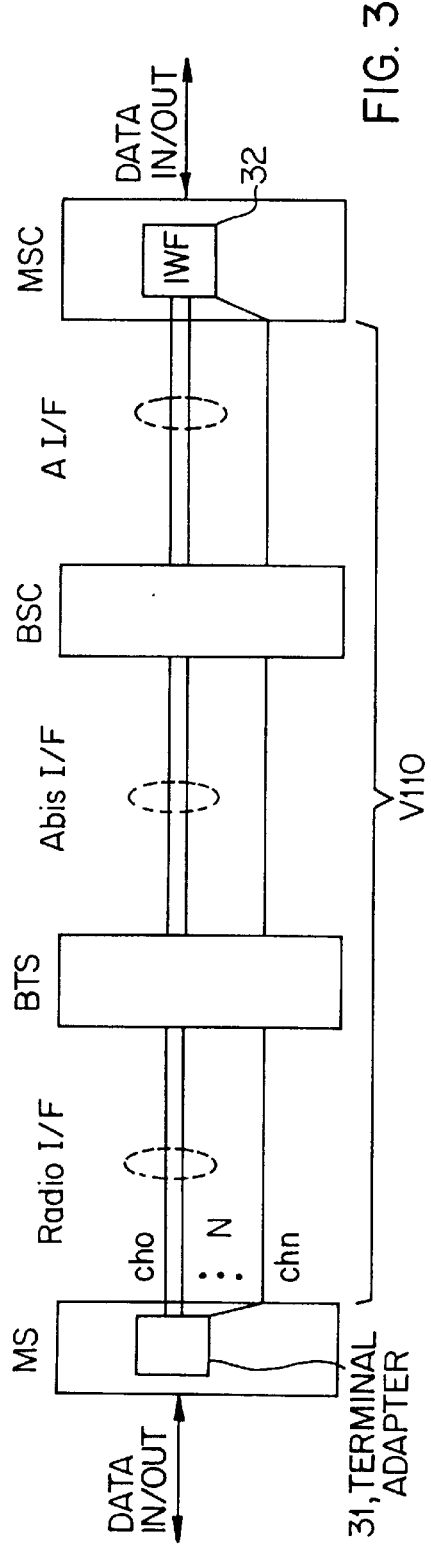

| | FRAME L | FRAME L+1 | FRAME L+2 | |
|---|---|---|---|---|
| ch1 | N1 = 42, k = 0<br>n = 101010 | N1 = 42, k = 0<br>n = 101010 | N1 = 42, k = 0<br>n = 101010 | . . . |
| ch2 | N1 = 42, k = 0<br>n = 101010 | N1 = 42, k = 0<br>n = 101010 | N1 = 42, k = 0<br>n = 101010 | . . . |
| ch3 | N1 = 33, k = 9<br>n = 100001 | N1 = 34, k = 8<br>n = 100010 | N1 = 33, k = 9<br>n = 100010 | . . . |

HIGH-SPEED DATA TRANSMISSION IN MOBILE COMMUNICATION NETWORKS

FIELD OF THE INVENTION

The invention relates to high-speed data transmission in digital mobile communication networks.

BACKGROUND OF THE INVENTION

In telecommunication systems of the time division multiple access (TDMA) type, the communication on the radio path is time-divisional and occurs in successive TDMA frames each of which consists of several time slots. A short information packet is transmitted in each time slot in the form of a radio-frequency burst that has a limited duration and that consists of a number of modulated bits. The time slots are primarily used for conveying control and traffic channels. The traffic channels are used for transferring speech and data. The control channels are for signalling between a base station and mobile stations. An example of a TDMA radio system is the Pan-European digital mobile system GSM (Global System for Mobile Communications).

In conventional TDMA systems, one traffic channel time slot is allocated for communication to each mobile station for the transmission of data or speech. For example the GSM system may therefore comprise as many as eight parallel connections to different mobile stations on a radio frequency carrier. The maximum data transfer rate on one traffic channel is limited to a relatively slow level, e.g. in the GSM system 9.6 Kbps or 12 Kbps, according to the available bandwidth and the channel coding and error correction employed in the transmission. In the GSM system, a so-called half-rate (max. 4.8 Kbps) traffic channel can also be selected for low speech coding rates. The half-rate traffic channel is established when a mobile station operates in an assigned time slot only in every other frame, i.e. at half the rate. Another mobile station operates in the same assigned time slot of every other frame. The system capacity, measured in the number of mobile subscribers, can thus be doubled, i.e. as many as 16 mobile stations can operate on the carrier frequency simultaneously.

In recent years, the need for high-speed data services in mobile networks has increased considerably. For example transmission rates of at least 64 Kbps would be required for the ISDN (Integrated Services Digital Network) circuit-switched digital data services. The data services of the public switched telephone network (PSTN), for example a modem and G3-type telefax terminals, require higher transmission rates such as 14.4 Kbps. One of the increasing areas of mobile data transmission that requires transmission rates exceeding 9.6 Kbps is mobile video services. Examples of such services include security surveillance by means of cameras, and video databases. The minimum data rate in video transmission may be for example 16 or 32 Kbps.

The transmission rates of the present mobile networks are not sufficient for meeting these new requirements, however.

An arrangement, which is disclosed in a co-pending patent application of the Applicant, WO95/31878 (unpublished on the filing date of the present application), relates to allocating two or more parallel traffic channels (subchannels) on the radio path for one high-speed data connection. The high-speed data signal is divided in the transmitter into these parallel subchannels for the transmission over the radio path, to be restored in the receiver. This approach enables the supply of data transmission services with as high as eight-fold transmission rate compared to the conventional rate, depending on the number of the traffic channels allocated. For example in the GSM system, the total user data rate of 19.2 Kbps is obtained by two parallel 9.6 Kbps subchannels, each channel being rate-adapted in the same manner as in the existing transparent 9.6 Kbps bearer services of the GSM system.

A problem relating to the use of parallel traffic channels is the data rates which cannot be rate-adapted with the existing methods of the GSM system even though these data rates can be evenly distributed between the available parallel subchannels.

For example the user data rate of 14.4 Kbps (according to e.g. ITU-T Recommendation V0.32bis) requires two transparent GSM traffic channels the data rate in each of which should be 7.2 Kbps (2×7.2 Kbps =14.4 Kbps), but there is no rate adaptation in the GSM system for the subchannel data rate of 7.2 Kbps.

Correspondingly, for example the user data rate of 40 Kbps (ITU-T Recommendation V0.120) requires five transparent GSM traffic channels in each of which the data rate should be 8 Kbps (40 Kbps: 5), but there is again no rate adaptation in the GSM system for such a subchannel data rate.

Another problem is the data rates that cannot be evenly divided into a required number of transparent GSM traffic channels. For example the user data rate of 56 Kbps (ITU-T Recommendation V0.110) requires at least six transparent GSM traffic channels, but it cannot be divided into these six parallel subchannels in such a way that the (V0.110) frames of each subchannel carry the same number of data bits (56 Kbps: 6=9333.333 bps).

Furthermore, the high-speed data transmission should be sufficiently flexible so that it could also support possible future high data rates that have not yet been standardized.

DISCLOSURE OF THE INVENTION

An object of the present invention is to provide a method and a telecommunication system which support the data adaptation of both standard and arbitrary transmission rates in high-speed data transmission utilizing parallel traffic channels.

A first aspect of the invention is a method for high-speed data transmission in a digital mobile system, said method comprising a step of transmitting data over the radio path between a mobile station and a fixed mobile network on a rate-adapted traffic channel allocated to the mobile station. According to the invention, the method is characterized by further steps of allocating at least two parallel rate-adapted traffic channels to a high-speed data signal, which requires a data rate exceeding the maximum transmission rate of a single traffic channel, utilizing transmission frames, wherein the total number of information bits is independent of the data rate of the high-speed data signal, for data transmission on parallel traffic channels, rate-adapting the high-speed data signal to the allocated traffic channels by employing a variable number of said total number of said information bits for the transmission of the actual user data within each transmission frame depending on said data rate of the high-speed data signal.

A second aspect of the invention is a digital mobile system wherein a mobile station and a fixed mobile network comprise a data transmitter and a data receiver which are capable of data transmission over the radio path on a traffic channel allocated to the mobile station. According to the invention, the system is characterized in that the fixed mobile network is arranged to allocate two or more parallel traffic channels to a high-speed data signal which requires a transmission rate exceeding the maximum transmission rate of one traffic channel, the data transmitters are arranged to insert a high-speed data signal into transmission frames wherein the total number of the information bits is independent of the data rate of the high-speed data signal to be transmitted by employing a variable number of said total number of the information bits in each transmission frame for the transmission of the actual user data according to the data rate of the high-speed signal.

In the present invention, a high-speed data signal is packed into transmission frames in which the number of information bits is fixed and independent of a data rate of a transmitted signal. The number of the information bits is such that the data rate of the frame is constant and corresponds to the standard rate adaptation of a traffic channel in a respective telecommunication system, e.g. 9.6 Kbps in the GSM system. A variable number of these information bits of the transmission frame is utilized for the transmission of the actual user data, depending on the original data signal rate. The rest of the bits are utilized for the transmission of control information or stuff bits. Therefore, the number of user data bits in any transmission frame on any of the parallel traffic channels can vary between 0 and a predetermined maximum number. In other words, the transmission rate of the user data in the transmission frames may freely vary between 0 and a predetermined maximum value.

By means of the invention, a signal of an arbitrary data rate can be transmitted through traffic channels that have been rate-adapted in one constant manner, by carrying out a further rate adaptation inside the transmission frames. For example in the GSM system, it is possible to use a standard 9.6 Kbps data-adapted transparent traffic channel and a transmission frame of 48 information bits according to the CCITT Recommendation V0.110. In such a case, different user data rates between 0 and 9.6 Kbps can be transmitted through a 9.6 Kbps rate-adapted traffic channel by changing the number of the information bits used for the user data transmission between 0 and 48 in the V0.110 frame.

Some of the "free" information bits of the transmission frame may be employed to detect how many of the frame information bits carry the actual user data.

BRIEF DESCRIPTION OF THE DRAWINGS

In the following, the invention will be described by means of preferred embodiments with reference to the accompanying drawings, in which FIG. 2 illustrates high-speed data transmission in two TDMA time slots over the radio path, FIG. 3 illustrates the network architecture according to the invention, which supports the high-speed data transmission of several traffic channels between a mobile station MS and an interworking function IWF in the GSM system.

PREFERRED EMBODIMENTS OF THE INVENTION

Figures 1, 4:
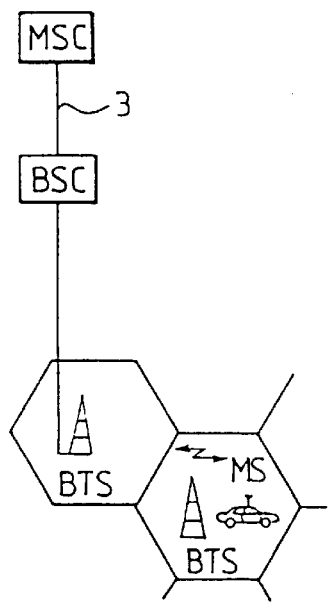
FIG. 1 illustrates a part of a mobile system wherein the invention can be applied.
FIG. 4 shows the V0.110 frame structure.

The present invention may be applied to high-speed data transmission in digital TDMA-type mobile communication systems, such as the Pan-European digital mobile communication system GSM, DCS1800 (Digital Communication System), the mobile communication system according to the EIA/TIA Interim Standard IS/41.3, etc. The invention will be illustrated below by using as an example a GSM-type mobile system, without being restricted thereto, however. FIG. 1 introduces very briefly the basic structural components of the GSM system, without describing their characteristics or the other elements of the system. For a more detailed description of the GSM system, reference is made to the GSM recommendations and to "*The GSM System for Mobile Communications*" by M. Mouly and M. Pautet (Palaiseau, France, 1992, ISBN:2-9507190-07-7).

A mobile services switching center controls the switching of incoming and outgoing calls. It performs similar functions as the exchange of the PSTN. Further, it also performs, together with the network subscriber registers, functions, such as location management, that are only characteristic of mobile telephone traffic. Mobile stations MS are connected to the MSC via base station systems BSS. A base station system BSS consists of a base station controller BSC and base stations BTS. For the sake of clarity, FIG. 1 only shows a base station system wherein two base stations are connected to the base station controller BSC and wherein one mobile station MS is located within the coverage area of the base stations.

The GSM system is a time division multiple access (TDMA) type system. The channel structures used in the radio interface are defined in greater detail in the ETSI/GSM recommendation 05.02. During normal operation, one time slot is allocated from a carrier frequency to a mobile station MS as a traffic channel in the beginning of a call (single slot access). The mobile station MS is synchronized with the allocated time slot to transmit and receive radio-frequency bursts. During the remaining time of the frame, the MS performs different measurements. The Applicant's co-pending patent applications WO95/31878 and PCT/FI95/00673 disclose a method wherein two or more time slots from the same TDMA frame are allocated to a mobile station MS which requires data transmission with a higher rate than what one traffic channel can provide. As regards the details of this procedure, reference is made to the aforementioned patent applications.

In the following, the procedure will be described with reference to FIG. 2 only as one way of carrying out high-speed data transmission, based on several parallel traffic channels, in a radio system. It should be noted, however, that the only matter essential for the invention is that a connection comprising several parallel traffic channels is established, and the invention itself relates to carrying out and synchronizing data transmission over such a connection.

FIG. 2 shows an example wherein successive time slots 0 and 1 are allocated to a mobile station MS from a single TDMA frame. A high-speed data signal DATAIN, which is to be transmitted over the radio path, is divided in a divider 82 into a required number of lower-speed data signals, namely DATA1 and DATA2. Each lower-speed data signal DATAL and DATA2 is separately subjected to channel coding, interleaving, burst formation and modulation 80 and 81, respectively, whereafter each lower-speed data signal is transmitted as a radio-frequency burst in a dedicated time slot 0 and 1, respectively. When the lower-speed data signals DATA1 and DATA2 have been transmitted over the radio path through different traffic channels, they are separately subjected in the receiver to demodulation, deinterleaving and channel decoding 83 and 84, respectively, whereafter the signals DATA1 and DATA2 are again combined in a combiner 85 of the receiver into the original high-speed signal DATAOUT. FIG. 2 also shows a transmission buffer 88 used in an embodiment of the invention, the data signal DATAIN being buffered into the buffer before being supplied to the divider 82.

FIG. 3 is a block diagram illustrating the GSM network architecture which implements such data transmission using several parallel traffic channels. The functions of the blocks 80, 81, 83 and 84 of FIG. 3, i.e. channel coding, interleaving, burst formation and modulation, and correspondingly demodulation, deinterleaving and channel decoding are situated on the side of the fixed network preferably at the base station BTS. The above-described TDMA frame is thus transmitted between the base station BTS and the mobile station MS in a radio interface Radio I/F. Each time slot is subjected to separate parallel processing at the base station BTS. The divider 82 and the combiner 85 of FIG. 2 may be located in the fixed network side remote from the base station BTS in another network element, such as BSC, whereupon the lower-speed data signals DATA1 and DATA2 are transmitted between this network element and the base station in the same way as the signals of normal traffic channels. In the GSM system, this communication takes place in TRAU frames according to the ETSI/GSM recommendation 08.60 between the base station BTS and a special transcoder/rateadapter unit (TRCU). The TRAU frames and the transmission associated thereto are not essential for the invention, since the invention relates to carrying out and synchronizing data transmission over the entire data connection utilizing several parallel traffic channels, i.e. between the divider 82 and the combiner 85.

In the GSM system, a data link is formed between a terminal adapter 31 in the mobile station MS and an interworking function IWF 32 in the fixed network. In data transmission occurring in the GSM network, this connection is a V0.110 rate-adapted, UDI-coded digital 9.6 Kbps full-duplex connection that is adapted to V0.24 interfaces. The V0.110 connection described herein is a digital transmission channel that was originally developed for ISDN (Integrated Services Data Network) technology, that is adapted to the V0.24 interface, and that also provides the possibility of transmitting V0.24 statuses (control signals). The CCITT recommendation for a V0.110 rate-adapted connection is disclosed in the CCITT Blue Book: V0.110. The CCITT recommendation for a V0.24 interface is disclosed in the CCITT Blue Book: V0.24. The terminal adapter 31 adapts the data terminal connected to the mobile station MS to a V0.110 connection, which is established over a physical connection utilizing several traffic channels chO to chN. The IWF couples the V0.110 connection to another V0.110 network, such as an ISDN or another GSM network, or to some other transit network, such as the public. switched telephone network PSTN. In the first case, the IWF only contains the divider/combiner 82/85 according to the invention. In the last-mentioned case, the IWF also contains for example a baseband modem by means of which data transmission is performed through the PSTN.

The frame structure used for data transmission on a V0.110 connection (9.6 Kbps) is shown in FIG. 4. The frame comprises 80 bits. Octet 0 contains binary zeroes, whereas octet 5 contains a binary one which is followed by seven E bits. Octets 1 to 4 and 6 to 9 comprise a binary one in bit position 1, a status bit (S or X bit) in bit position 8, and 6 data bits (D bits) in bit positions 2 to 7. The bits are transmitted from left to right and from top to bottom. The frame thus comprises 48 information bits D1 to D48 (user data). Bits S and X are used to transmit channel control information associated to the data bits in the data transmission mode.

As described above, the problem with such high-speed data transmission is the data rates which cannot be rate-adapted with the present methods of the telecommunications systems. For example in the GSM system, such rates include all data rates that are not multiples of 9.6 Kbps.

Figures 5, 6:
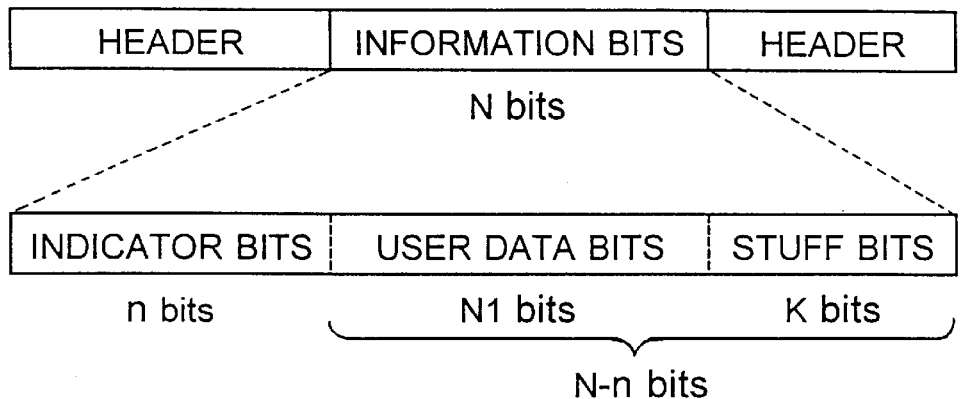
FIG. 5 shows the general structure of a transmission frame according to the invention.
FIG. 6 illustrates the adaptation of the user rate of 23.5 Kbps to three GSM traffic channels according to the invention.

This is solved in the invention by transmitting the user data bits through the traffic channels in frames the general structure of which is illustrated in FIG. 5. The frame consists of a header and information bits. Depending on the type of frame, the header comprises different kinds of synchronization and control information, which is not relevant to the present invention, however. Each frame carries N data or information bits. From these N bits, n bits (n<N) form an indicator field which indicates that N1 bits of the remaining N−n information bits are used for carrying the actual user data. The remaining k information bits, which are not used as indicator bits or user data bits in the frame, are occupied by stuff bits, the values of the stuff bits being set to binary one, for example. In this manner, each transmission frame on each of the parallel traffic channels may carry any number of user data bits between 0 and N−n. Successive transmission frames on the traffic channel may carry a different number of user data bits. Due to this, the correct average user data rate can always be maintained. The user data rate is controlled in the transmitter for example in such a way that the divider 82 of FIG. 2 monitors the amount of data in the transmission buffer 88 and determines the number of the user data bits in the next frame(s) accordingly. If the buffer 88 tends to fill up, a predetermined higher threshold level is reached, and one or more of the subsequent frames will be arranged to contain one or several data bits more until the buffer level is again below the aforementioned threshold. If the buffer 88 tends to empty, and when a lower threshold level is reached, for example, the divider 82 inserts one or more data bits less in one or several of the subsequent frames until the normal buffer level is reached, e.g. until the buffer level exceeds the lower threshold level. The divider 82, which inserts a required number N1 of user data bits in the frame, also fills the additional information bits with stuff bits and sets the indicator bits to the value N1. This will be described in greater detail with reference to FIG. 6.

The application of the present invention to the GSM system will be described below. It is assumed that rate-adapted transparent full-rate 9.6 Kbps traffic channels are used as the parallel traffic channels, the V0.110 frames of FIG. 4 being transmitted on these channels. The frame thus comprises 48 information bits D1 to D48, i.e. N=48. Six information bits, e.g. bits D1 to D6, are needed for indicating the number N1 of the user data bits among the remaining information bits in the frame. In other words, n=6. This leaves 42 bits (N−n=42) for user data in the V0.110 frame. These available bits are bits D7 to D48, for example.

A few examples concerning the rate adaptation of high-speed data to such a V0.110 frame of a GSM traffic channel will be studied below.

EXAMPLE 1

Assume that the user data rate is 64 Kbps, whereupon eight parallel GSM traffic channels are needed. The rate adaptation according to the invention may then be carried out for example in the following manner. Each V0.110 frame on each traffic channel carries 40 user data bits (bits D7 to D46) and two stuff bits (D47 and D48). Then N1=40, and the binary number 101000 is set as the value for the indicator bits D1 to D6.

EXAMPLE 2

Assume that the user data rate is 56 Kbps, whereupon seven GSM traffic channels are needed. The rate adaptation according to the invention may then be carried out for example in the following manner: each V0.110 frame on each channel carries 40 user data bits (D7 to D46) and two stuff bits (D47 and D48). Then N1=40, and the values of the bits D1 to D6 are 101000.

EXAMPLE 3

Assume that the user data rate is 14.4 Kbps, whereupon two GSM traffic channels are needed. The rate adaptation according to the invention may then be carried out for example in the following manner: each V0.110 frame on each channel carries 36 user data bits (bits D7 to D42) and six stuff bits (bits D43 to D48). Then N1=36, and the values of the indicator bits (D1 to D6) are 100100.

EXAMPLE 4

Assume that the user data rate is 28.8 Kbps, whereupon four GSM traffic channels are needed. The rate adaptation according to the invention may then be carried out for example in the following manner: each V0.110 frame on each traffic channel carries 36 user data bits (bits D7 to D42) and six stuff bits (bits D43 to D48). Then N1=36, and the values of the indicator bits (D1 to D6) are 100100.

Example 5 illustrates the flexibility of the method according to the invention in adapting an arbitrary user data rate to transparent parallel traffic channels. Assume that the user data rate is 23.5 Kbps, whereupon three parallel GSM traffic channels are needed. The rate adaptation according to the invention may then be carried out for example in the following manner illustrated in FIG. 6. The V0.110 frames on traffic channels ch1 and ch2 carry at all times 42 user data bits (bits D7 to D48). Since N1=N=42, stuff bits are not needed and the values of the indicator bits D1 to D6 are 101010. A third parallel traffic channel ch3 carries 33 user data bits (bits D7 to D39) and nine stuff bits (bits D40 to D48) in every second V0.110 frame. In these frames N1=33, whereupon the values of the indicator bits (D1 to D6) are 100001. All the other V0.110 frames of this traffic channel ch3 carry 34 user data bits (bits D7 to D40) and eight stuff bits (bits D41 to D48). In these frames N1=34, and the values of the indicator bits (D1 to D6) are 100010. Due to this arrangement, the total average user rate of these three channels is exactly 23.5 Kbps.

The indicator bits according to the invention occupy the place of n data bits in the frame (e.g. n=6). If traffic channel capacity is to be saved, user data rates which are divisible by 9.6 Kbps can be transmitted by using an existing rate adaptation for the GSM data services, i.e. standard V0.110 frames which contain no indicator bits or stuff bits but 48 user data bits are then utilized. In such alternative implementations the rate adaptation according to the invention would only be applied to user data rates which are not divisible by 9.6 Kbps. For example 28.8 Kbps can be transmitted with normal rate adaptation on three 9.6 Kbps traffic channels, whereas the rate adaptation according to the invention requires four traffic channels in Example 4.

Traffic channel capacity can also be saved in such a way that the present invention is applied only on one or two channels. The rest of the traffic channels may then use the existing 9.6 Kbps rate adaptation.

Even though the invention is described above with reference to certain embodiments, it should be understood, however, that the description is only exemplary and it may be varied and modified without deviating from the spirit and scope of the invention defined in the appended claims.

What is claimed is:

1. A method for high-speed data transmission in a digital mobile system, said method comprising:

allocating at least two parallel rate-adapted traffic channels to a mobile station for transmission of a high-speed data signal, which requires a data rate exceeding a maximum transmission rate of a single traffic channel, over a radio path between said mobile station and a mobile network, utilizing transmission frames, wherein a fixed total number of information bits is independent of the data rate of the high-speed data signal, for data transmission on said allocated parallel traffic channels, rate-adapting the high-speed data signal to the allocated traffic channels by using a variable number of said fixed total number of said information bits for the transmission of actual user data within each of the transmission frames depending on said data rate of the high-speed data signal and inserting one of stuff bits and control bits in place of unused information bits within each of the transmission frames.

2. The method according to claim 1, wherein said rate adapting comprises:

inserting the data of the high-speed data signal to be transmitted into the transmission frames, each of the transmission frames comprising a fixed number N of the information bits, utilizing n bits of said N information bits to indicate how many of the remaining N−n information bits carry user data, inserting stuff in place of unused information bits.

3. The method according to claim 1 further comprising:

varying a number of the information bits used for transmission of user data in different ones of the transmission frames according to an amount of the data buffered in a transmitter.

4. The method according to claim 2, further comprising:

transmitting the user data, in all of the N information bits of the transmission frames, if a ratio between a user data rate of the high-speed data signal and a transmission rate of any one of the rate-adapted traffic channels is an integer.

5. A digital mobile system, comprising:

a mobile station, a mobile network a plurality of data transmitters, and a plurality of data receivers in said mobile station and said mobile network, said mobile network allocating at least two parallel traffic channels to said mobile station for transmission of a high-speed data signal which requires a transmission rate exceeding a maximum transmission rate of one traffic channel over a radio path between said data transmitters and said receivers in said mobile station and said mobile network, each transmission frame transmitted on said allocated traffic channels having a fixed total number of information bits, the fixed total number being independent of a data rate of the high-speed data signal to be transmitted, the data transmitters rate-adapting said high-speed data signal into said transmission frames by using a variable number of said fixed total number of the information bits in each of the transmission frames being used for the transmission of actual user data according to a user data rate of the high-speed data signal, and inserting one of stuff bits and control bits in place of unused information bits within each of the frames.

6. The system according to claim 5, wherein:

each of the transmission frames comprises a fixed number N of the information bits, n bits of said N information bits provide a control field which indicates how many of the remaining N–n information bits carry user data, and the information bits which are not used for said control field and transmission of the user data are stuff bits.

7. The system according to claim 5, wherein a number of the information bits used for transmitting user data is variable between 0 and N–n bits depending on the data rate of the high-speed data signal.

8. The system according to claim 5, wherein the data transmitters are arranged to adjust the number of the information bits used or transmitting user data in different ones of the transmission frames according to an amount of data in a transmission buffer.

9. The system according to claim 5, wherein all of the N information bits of each of the transmission frames contain user data when a ratio between the user data rate of the high-speed data signal and a transmission rate of any one of the traffic channels is an integer.

* * * * *